United States Patent
Bosson

(10) Patent No.: US 8,842,838 B2
(45) Date of Patent: *Sep. 23, 2014

(54) METHOD AND APPARATUS OF SECURELY PROCESSING DATA FOR FILE BACKUP, DE-DUPLICATION, AND RESTORATION

(71) Applicant: Kaseya International Limited, St. Helier (JE)

(72) Inventor: Charles Bosson, Ojai, CA (US)

(73) Assignee: Kaseya International Limited (JE)

(*) Notice: Subject to any disclaimer, the term of this patent is extended or adjusted under 35 U.S.C. 154(b) by 0 days.

This patent is subject to a terminal disclaimer.

(21) Appl. No.: 13/854,310

(22) Filed: Apr. 1, 2013

(65) Prior Publication Data

US 2013/0230164 A1  Sep. 5, 2013

Related U.S. Application Data

(63) Continuation of application No. 13/074,221, filed on Mar. 29, 2011, now Pat. No. 8,428,265.

(51) Int. Cl.
| | |
|---|---|
| *H04L 9/00* | (2006.01) |
| *H04L 9/32* | (2006.01) |
| *H04L 9/08* | (2006.01) |
| *G06F 17/30* | (2006.01) |
| *H04L 9/06* | (2006.01) |
| *G06F 11/14* | (2006.01) |

(52) U.S. Cl.
CPC .............. *H04L 9/06* (2013.01); *G06F 11/1464* (2013.01); *H04L 9/0841* (2013.01); *G06F 17/3015* (2013.01); *G06F 11/1469* (2013.01); *G06F 11/1453* (2013.01); *H04L 9/3239* (2013.01); *G06F 17/30156* (2013.01)
USPC .............................. 380/277; 380/28; 713/189

(58) Field of Classification Search
CPC ....... H04L 9/06; H04L 9/0618; H04L 9/0625; H04L 9/0631; H04L 9/0687
USPC .............. 380/28–29, 277, 281, 284; 713/181, 713/189–191, 193; 726/26–33; 707/609, 707/615, 626, 633, 648, 655, 662, 682, 821
See application file for complete search history.

(56) References Cited

U.S. PATENT DOCUMENTS

| | | | | |
|---|---|---|---|---|
| 7,380,139 | B2 * | 5/2008 | Tagawa et al. | 713/193 |
| 8,046,509 | B2 * | 10/2011 | Bondurant | 710/68 |
| 8,416,954 | B1 * | 4/2013 | Raizen et al. | 380/277 |
| 8,428,265 | B2 * | 4/2013 | Bosson | 380/277 |

* cited by examiner

*Primary Examiner* — Hosuk Song

(57) ABSTRACT

Disclosed are an apparatus and method of de-duplicating at least one data file. One example method may include requesting a list of data rows stored in a database to be de-duplicated, receiving the list of the data rows based on a single filekey associated with the at least one data file, copying the at least one data file to a data storage memory, and deleting the data rows entries from a file registry of the database.

20 Claims, 6 Drawing Sheets

METHOD AND APPARATUS OF SECURELY PROCESSING DATA FOR FILE BACKUP, DE-DUPLICATION, AND RESTORATION

CROSS-REFERENCE TO RELATED APPLICATIONS

The instant application is a continuation of and claims priority from U.S. patent application Ser. No. 13/074,221, filed Mar. 29, 2011, entitled METHOD AND APPARATUS OF SECURELY PROCESSING DATA FOR FILE BACKUP, DE-DUPLICATION, AND RESTORATION, the entire contents of which are incorporated by reference herein.

TECHNICAL FIELD OF THE INVENTION

This invention relates to a method and apparatus of processing secure data file backup, data de-duplication, and data restoration procedures.

BACKGROUND OF THE INVENTION

With data computing in general, data de-duplication is a form of data compression used to eliminate redundant data and increase storage utilization. In the de-duplication process, duplicate data may be deleted, which leaves only a unique copy of the data to be stored along with references to the unique copy of the data. In general, de-duplication may reduce the required storage capacity since only the unique data is stored.

Depending on the type of de-duplication being implemented, the number of redundant data files may be reduced, or, even portions of data files or other similar data may also be removed. Different applications and data types have different levels of data redundancy. Backup applications generally benefit the most from de-duplication due to the nature of repeated full backups of an existing file system.

In operation, de-duplication identifies identical sections of data and replaces them by references to a single copy of the data. Data de-duplication increases the speed of service and reduces costs. Data de-duplication increases overall data integrity and includes reducing overall data protection costs. Data de-duplication allows users to reduce the amount of disk space they need for data backup by 90 percent or more. It also reduces the data that must be sent across a WAN for remote backups, replication, and disaster recovery.

Data de-duplication is particularly effective when used with virtual servers, providing the ability to de-duplicate the virtual system state files used when deploying virtual servers. In many cases, virtual servers contain duplicate copies of operating system and other system files. Additionally, when backing up or making duplicate copies of virtual environments, there is also a high degree of duplicate data. Data de-duplication can provide considerable capacity and cost savings compared to the conventional disk backup technologies.

However, when data is transformed, de-duplicated and/or accessed, certain concerns arise about potential loss of data or data integrity (e.g., unauthorized access). By definition, data de-duplication systems store data differently from how it was previously written. As a result, there are concerns with the integrity of the data. However, the integrity of the data will ultimately depend upon the design of the de-duplicating system, and the quality used to implement the algorithms. One method for de-duplicating data relies on the use of cryptographic hash functions to identify duplicate segments of data. If two different pieces of information generate the same hash value, this is known as a collision. The probability of a collision depends upon the hash function used, and although the probabilities are small, they are always non-zero. As a result, concerns arise that data corruption can occur if a hash collision occurs.

In addition to the prospect of data integrity, malicious attacks are another major concern anytime user data is accessed and/or modified. If user data is processed for de-duplication then the user data is increasingly vulnerable to unauthorized access to the backup data. Providing data security during the data backup, data de-duplication and data restore stages of data processing is important.

SUMMARY OF THE INVENTION

One embodiment of the present invention may include a method of de-duplicating at least one data file. The method may include requesting a list of data rows stored in a database to be de-duplicated, receiving the list of the data rows based on a single filekey associated with the at least one data file, copying the at least one data file to a data storage memory, and deleting the data rows entries from a file registry of the database.

Another example embodiment of the present invention may include an apparatus configured to de-duplicate at least one data file. The apparatus may include a transmitter configured to request a list of data rows stored in a database to be de-duplicated, a receiver configured to receive the list of the data rows based on a single filekey associated with the at least one data file, and a processor configured to copy the at least one data file to a data storage memory, and delete the data rows entries from a file registry of the database.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

De-duplication may be referred to as a process of removing duplicate files from a storage system and replacing the files with pointers to a single source copy of the file. Security measures which limit unauthorized access to the data are important throughout the processes of handling duplicate files, de-duplicating volumes of data files, and restoring the de-duplicated data files. Implementing security measures to ensure that the archived data is safe from malicious attacks may limit unauthorized access to the archived data.

Figure 1:
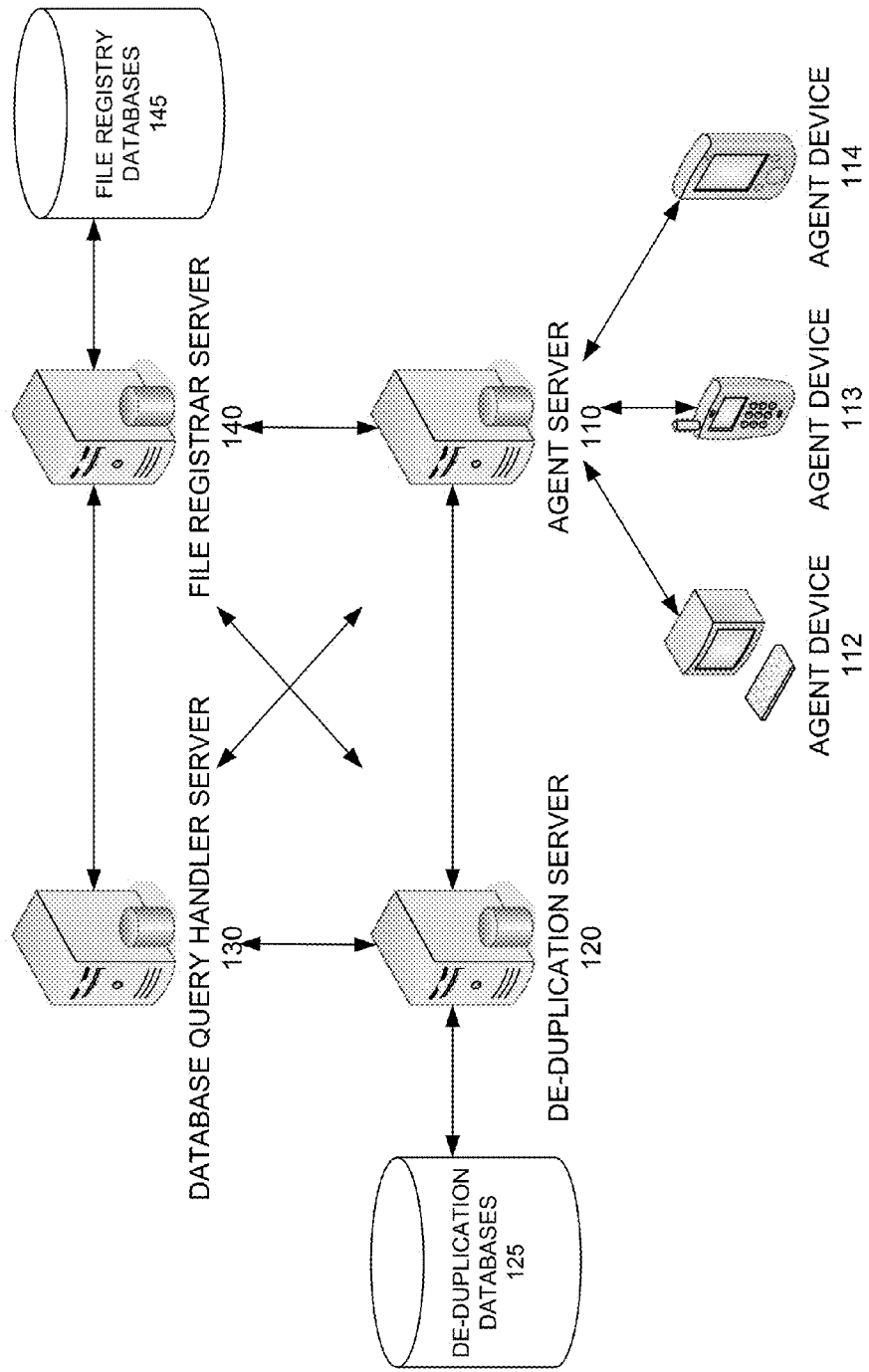
FIG. 1 illustrates an example network configuration configured to support data processing procedures, according to example embodiments of the present invention.

According to an example procedure, a plurality of network devices may be in communication over a communication network. FIG. 1 illustrates an example communication network including devices that may be implemented when performing data storage and data de-duplication efforts. Referring to FIG. 1, a communication network includes a database query handler server 130, a file registrar server 140, a de-duplication server 120 and an agent server 110. The agent server 110 may be supporting agent communications with an agent application operating on one or more agent device 112, 113 and 114. Agent devices 112-114 may be a personal computer, laptop computer, smartphone, tablet computing device, etc.

In operation, the agent device 112 may be currently executing an instance of the agent application or agent process that communicates with the agent server 110. For example, the agent process may be installed and running on the agent device 112 to perform tasks, such as data backup duties that are assigned to the agent process. The agent server 110 may be used to manage any number of agent devices by communicating with the agent devices 112-114 over a network communication medium, such as a wired, wireless and/or remote communication connection (e.g. the Internet).

Another communication device is the de-duplication server 120, which may operate as a standalone server or as part of one of the other communication devices illustrated in FIG. 1. The de-duplication server 120 may be responsible for identifying the redundant storage data included in any of the communication devices illustrated in FIG. 1. The de-duplication server 120 may reduce the space required to maintain a current data storage record of data files. The database query handler server 130 also operates as a standalone server which accepts requests from the agents 112-114 and/of the de-duplication server 120 regarding the contents of the file registry and one or more de-duplication registry database(s) 125. The file registrar server 140 may also be a standalone server configured to accept asynchronous requests to register a new file in the file registry database(s) 145.

The network devices illustrated in FIG. 1 may communicate using secure protocol communications which provide data integrity and/or security enabled functionality. For instance, one example protocol may include a cyclic redundancy checksum (CRC), which is commonly used to detect data corruption. CRC is used to verify that an agent possesses a valid copy of a file corresponding to a given file digest. The CRC is well known in the art, and thus further detail regarding the CRC procedure will be omitted from further discussion.

According to example embodiments, another example security communication protocol may include the Diffie-Hellman (D-H) protocol. The D-H protocol is a key-agreement protocol which permits parties to create a shared secret message over unsecure channels without exchanging private keys. Yet another security communication protocol may include a secure hash standard (SHA-1) cryptographic hash function used to generate digests of files to be stored in memory. Other examples may include an open-SSL or secure socket layer communication, which is not a protocol, but rather an open source library of cryptographic tools, including SSL, RSA, etc.

Another example protocol which may be implemented for security measures may include the advanced encryption standard (AES), which is a computer security standard that was originally created to replace the DES standard. AES operates as a cryptography scheme with a symmetric block cipher that encrypts and decrypts 128-bit blocks of data. Lengths of 128, 192, and 256 bits are standard key lengths used by AES.

In operation, the de-duplication server 120 may operate as a crawler application. The de-duplication server 120 and the database query handler server 130 may share the same D-H public key and private key pair. The public key may be pushed to each agent server(s) 110. Each agent server 110 may generate and store a D-H key pair for each of its agent devices 112, 113 and/or 114. The key pair may be passed to the agent devices 112-114 securely when a backup processor is executed.

In order to store a data file, an agent process operating on the agent server 110 and/or an agent device 112 may create a random AES key. The symmetric key may then be used to encrypt the data to be stored. The agent process may also generate the D-H shared secret and use it to encrypt the AES key. The encrypted symmetric key may be stored in the metadata of the data file to be stored. The de-duplication server 120 may provide a de-duplication crawler application, and the database query handler server 130 may be used to decrypt the key from one agent and encrypt it for the benefit of a different agent, using that agent's public key. This allows different agent applications to transfer and receive data securely.

The de-duplication procedure may implement two different databases including a file registry database(s) 145 and a de-duplication database(s) 125. The file registry database 145 maintains a registry of all files backed up in an online storage memory. The file registry database 145 can be modified periodically by deleting older unique rows of data, which represent files that are unlikely to ever be de-duplicated.

Data stored in the file registry database 145 may include certain characteristics for each row of data. For example, each row may include a file key, such as a SHA-1 digest combined with a zero-padded file size. The data row may also include a uniform resource identifier (URI) of a stored file, and a CRC of the stored file, encrypted with the servers' public keys. This is used to verify that an agent owns a copy of the file it is backing up or restoring. Additionally, the data row may also include a creation date of the row, which is used to allow pruning of stale and unique files.

The de-duplication registry database 125 maintains a record of de-duplicated source files. Each row may include a file key SHA-1 digest combined with a zero-padded file size. Each row may also include a uniform resource identifier (URI) of the stored file, and a CRC of the data file, encrypted with the servers' public keys. This is used to verify that an agent owns a copy of the file it is backing up or restoring. The data row of the de-duplication registry database 125 may also include an AES key encrypted with a shared secret of the server and the original owning agent, a D-H public key of the agent used to encrypt the AES key, and a count of link files pointing to a source file. The de-duplication registry database 125 maintains a record of the modified date of data files, which is used to allow deletion of stale files no longer in use (e.g., the "count of link files" has been zero for some arbitrary time period).

A data file stored in any of the storage database may include a file stored in an online storage location that contains both the encrypted data and various different instances of metadata. Each file instance includes data encrypted with an AES key. The metadata may include an AES key encrypted with the agent and server shared secret, and the agent public key. A link file may be a text file placed in storage at the location of the de-duplicated file. Each link file may include metadata, such as a URI of a repository source file, a server public key from the transaction, and an AES key encrypted with the agent and server shared secret. The metadata may also include a file key SHA-1 digest and a file size of the stored file. This provides a way to link the file to a row in the de-duplication registry database 125.

Figure 2:
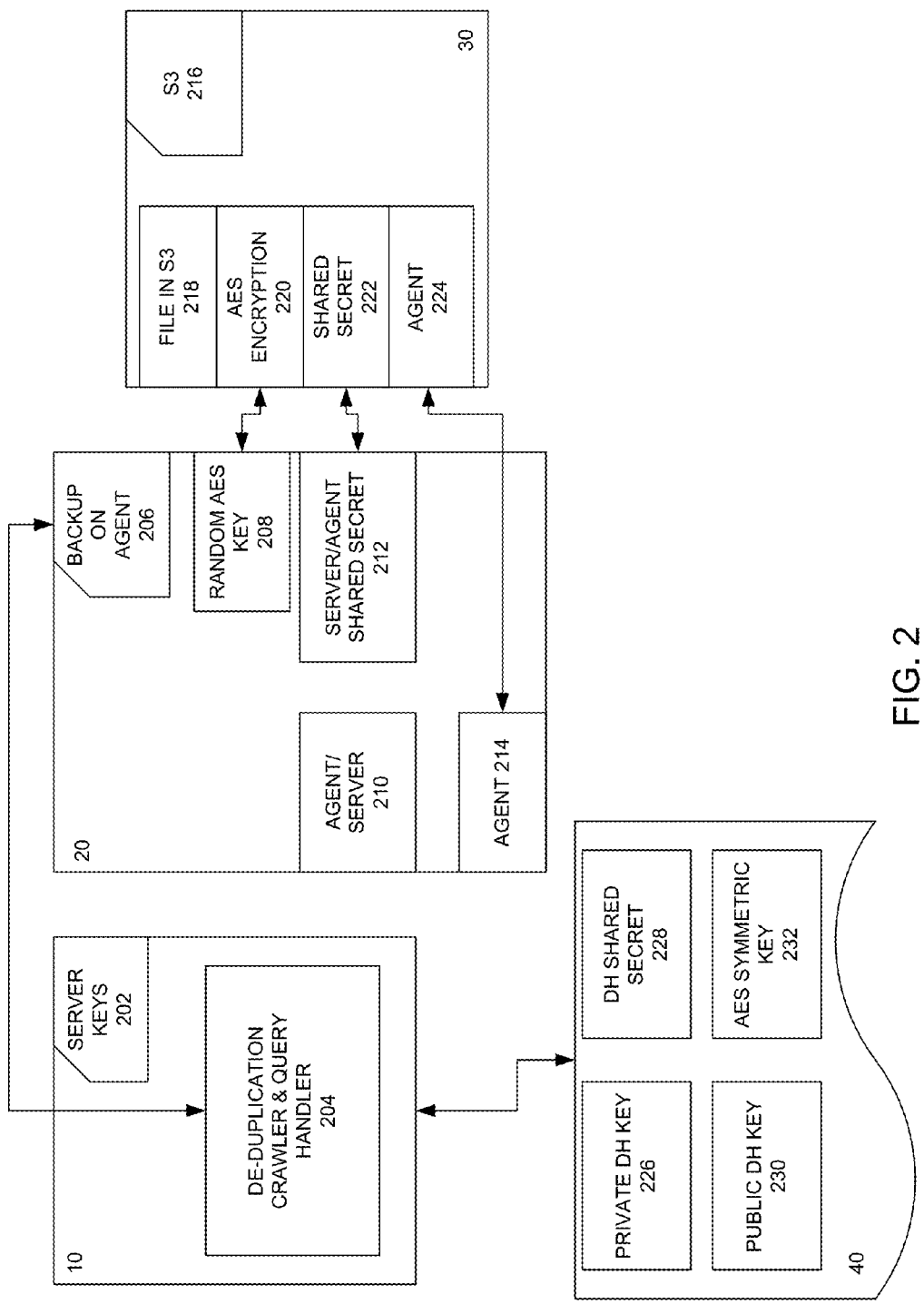
FIG. 2 illustrates an example system configuration of performing a data backup operation, according to an example embodiment of the present invention.
Figure 3:
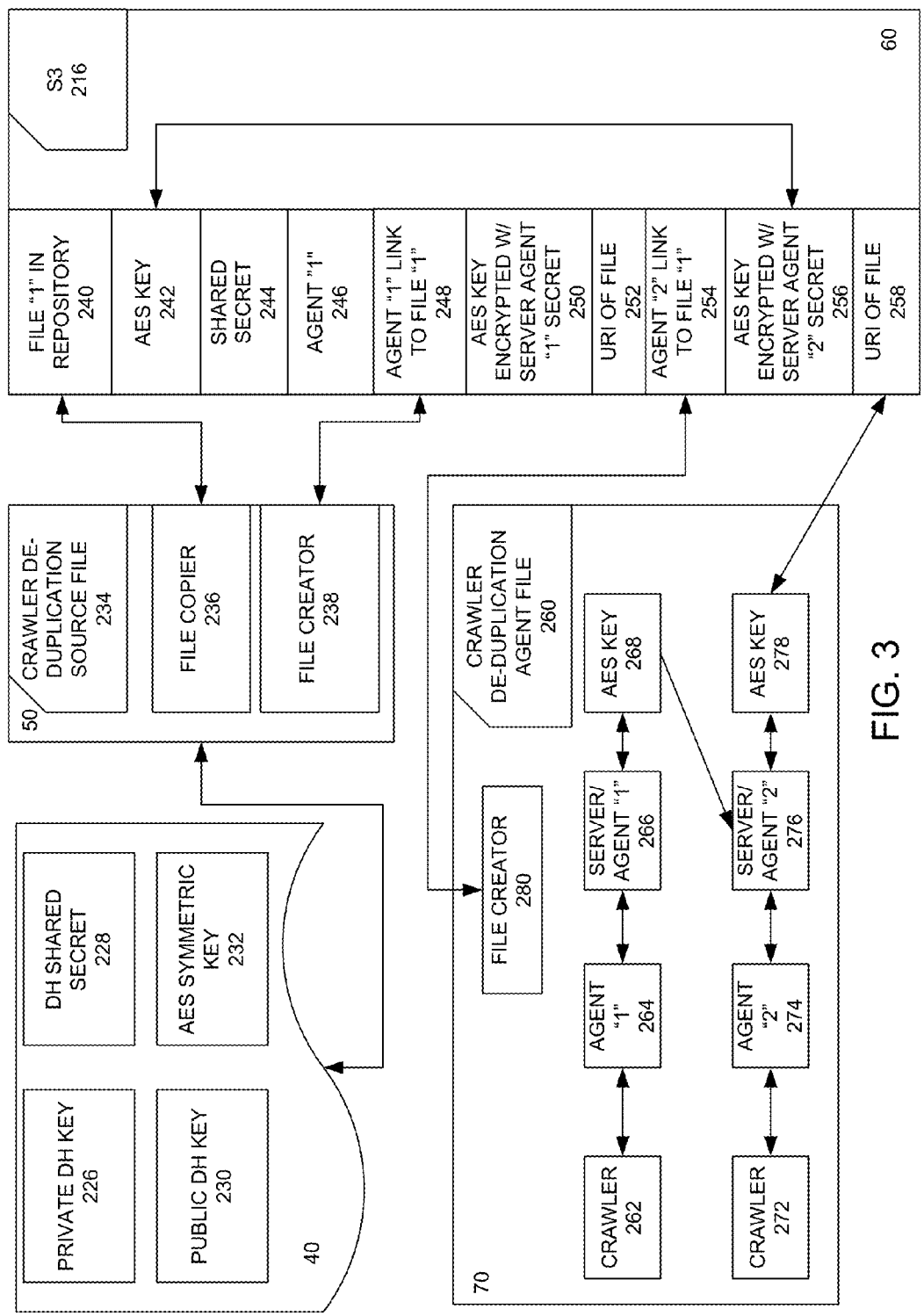
FIG. 3 illustrates an example system configuration of performing a data de-duplication operation, according to an example embodiment of the present invention.
Figure 4:
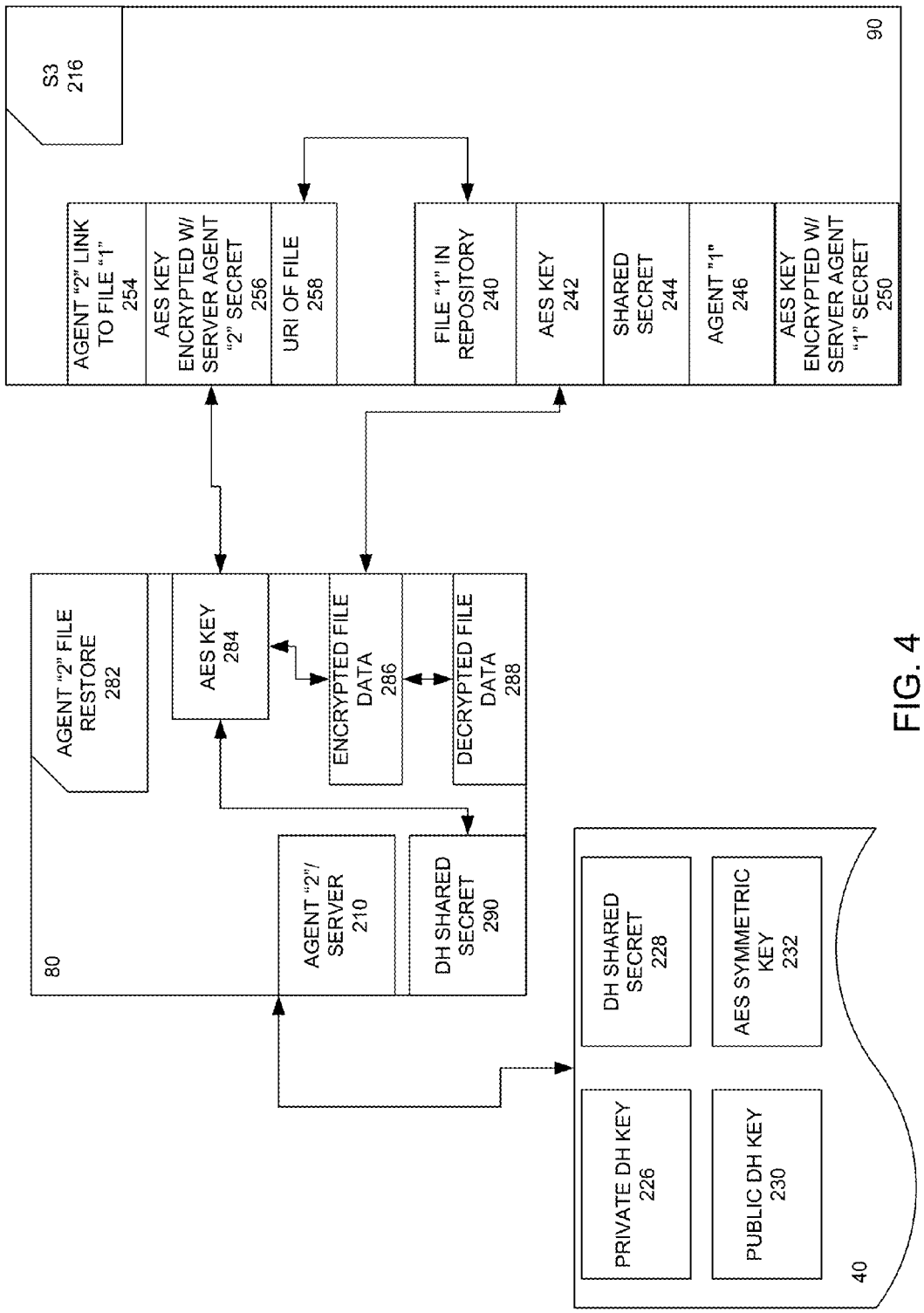
FIG. 4 illustrates an example system configuration of performing a data restore operation, according to an example embodiment of the present invention.

The following description with reference to FIGS. 2-4 describes example scenarios of performing data file backups, data file de-duplication and data file restoration procedures, respectively. FIG. 2 illustrates an example of data file restoration. Referring to FIG. 2, processing module 10 includes server keys 202 and a de-duplication crawler and query handler application 204, which communicates with a backup application on agent 206 of processing module 20. Processing module 20 includes an agent/server process 210, an agent process 214, a random AES key 208 and a server/agent shared secret 212.

Processing module 40 includes a set of keys that may be preconfigured and accessed at any time, including a private D-H key 226, a D-H shared secret 228, a public D-H key 230 and an AES symmetric key 232. The components of processing module 40 may be shared with processing module 10 to exchange data securely via one or more of the agent and server processes 210, 212, 214, etc. Processing module 30 may include an S3 file format configuration module 216. The data files may be stored in a S3 format 218, and an AES encryption 220 may be used with a shared secret 222 and an agent process 224 in accordance with the S3 format configuration module 216.

The process of backing up a file by an agent may include backing up files that have not been de-duplicated and files that have been de-duplicated. In a first example of backing up files, the files have not been de-duplicated. The agent process operating on one or more of the agent devices 112-114 and/or the agent server 110 determines that the file requires a mirror backup. Next, it is determined that the file is a candidate for de-duplication based on the file characteristics, such as file type, file size, etc. The agent process may then create a "filekey" composed of the SHA-1 digest of the file and the size of the file in bytes, and create a CRC checksum of the file, encrypt the CRC data with the shared secret and send the CRC data, the filekey, and its D-H public key to the database query handler 130 to determine if the file has been de-duplicated.

In response to the agent process actions, the database query handler 130 checks the de-duplication registry for existence of the filekey. If there is no entry for the given digest field, then a "false" response is returned to the agent process. The agent process may then generate a random AES key, and the agent/server shared secret. The agent process may also encrypt the AES key with the shared secret and store the encrypted key in the file metadata, and store its D-H public key in the file metadata, unencrypted. The agent process may further compress and encrypt the file with the AES key while streaming the file to storage, and register the file with the file registrar server 140 by sending the encrypted CRC data. The file registrar server 140 may enter a row in the file registry database 125 containing the "filekey", the URI of the file in storage, the CRC data, and the creation date of the file.

In another example, the file to be backed up may have already been de-duplicated. In this example, several of the above-noted operations from the first backup example are the same, however, certain subsequent operations are different. According to a first operation, the agent process operating on one or more of the agent devices 112-114 and/or the agent server 110 determines that the file requires a mirror backup. Next, it is determined that the file is a candidate for de-duplication based on the file characteristics, such as file type, file size, etc. The agent process may then create a "filekey" composed of the SHA-1 digest of the file and the size of the file in bytes, create a CRC checksum of the file, generate an agent/server D-H shared secret, encrypt the CRC data with the shared secret and sends the CRC data, the filekey, and its D-H public key to the database query handler 130 to determine if the file has been de-duplicated.

In response, the database query handler server 130 may perform various operations to process the data file. For instance, the database query handler server 130 may check the de-duplication registry database 145 for the existence of the "FileKey." If the entry is found, the database query handler server 130 may decrypt the incoming CRC data and the CRC data from the database and compare them. If there is no match between the incoming CRC data and the pre-stored CRC data then a "false" data message is returned to the agent process, and the agent continues as in the previous example. If the match succeeds, then the AES key is decrypted in the de-duplication registry row in memory and the AES key is re-encrypted for the agent process. Additionally, a "countOfDupes" parameter that measures the number of de-duplication efforts is incremented in a column of the de-duplication registry row in memory. Lastly, a "true" value is returned along with the AES key, and the URI to the agent process. The agent process then creates the link file containing the URI of the repository file and the encrypted AES key in metadata, and stores the link file in an online storage.

Referring to FIG. 2, the de-duplication crawler and query handler 204 have a D-H key pair. All pubic keys are available to the servers' devices. During the backup procedure, the agent 214 receives its D-H key pair along with the server public keys. A random AES key is generated and the file is encrypted with the new AES key and stored in the S3 format configuration module 216. A random AES key is generated at module 208 and the file is encrypted with the AES key and stored in the S3 format configuration module 216. The agent/server module 210 encrypts the AES key and uses a shared secret module 212 to encrypt the AES key and stores it in metadata with the shared secret module 222. The agent 214 stores the agent public key in the metadata and shares it with the agent 224.

FIG. 3 illustrates an application module configuration used to perform a de-duplication procedure. Referring to FIG. 3, like numerals represent like elements. Module 50 includes a crawler de-duplication source file 234, a file copier 236 and a file creator 238. Module 60 includes a S3 file format configuration module 216 with a file "1" in repository 240 module, an AES key module 242, a shared secret module 244, an agent "1" module 246, an agent "1" link to a file "1" 248, an AES key encrypted with a server/agent secret module 250, a URI of file "1" 252, an agent "2" link to file "1" 254, an AES key encrypted with server agent "2" secret 256 and a URI of file "1" 258. Module 70 includes a crawler de-duplication agent file 260, a de-duplication crawler 262, an agent "1" 264, a server/agent "1" 266, an AES key 268, a de-duplication crawler for agent "2" 272, an agent "2" 274, a server/agent "2" 276, an AES key 278 and a file creator module 280.

According to another example embodiment, a de-duplication process is disclosed. The de-duplication process may be performed by a de-duplication crawler and query handler 204 operating as a processing module of the database query handler server 130. The de-duplication crawler application requests a list of rows for de-duplication from the database query handler 130. In response, the database query handler server 130 returns a batch including all rows, or, a maximum number of rows for a single "FileKey."

The de-duplication crawler may then query the database query handler 260 to determine if the "FileKey" has already been de-duplicated. In the first row in the batch data, if the file has not already been de-duplicated, then the file may be copied and metadata may be transferred to a "repository" bucket in the online storage location. For all of the rows in the batch data, the AES key may be decrypted and re-encrypted for the current agent using the established shared secret 244, and a "link file" may be created by file creator 280 in place of the original file. The link file may include the URI of the repository copy and the encrypted AES key in the metadata. Lastly, the row entries from the file registry stored in the file registry database may be deleted.

Referring again to FIG. 3, the crawler de-duplication source file 234 may be used to copy a file via the file copier 236 and store the file in the repository location 240 in the S3 file format configuration module 216. The crawler de-duplication source file 234 creates a link file including the URI of the repository file. The agent public key is deleted from the link file as the owner of the link file holds the key.

The crawler de-duplication agent file 260 creates a link file via file creator 280 including the URI of the repository file and stored the file in an agent "2" link to file "1" location 254. As may be observed from the parallel processes of crawler 262, agent "1" 264, server/agent "1" 266, AES key 268, and, crawler 272, agent "2" 274, server/agent "2" 276 and AES key 278, the server generates the agent "1" server shared secret 266 and decodes the AES key 268. The information is shared with the server/agent "2" shared secret 276 and the AES key 278. The server generates the agent "2"/server shared secret and encodes the AES key 278. The encoded key is stored in the agent "2" link file 254.

FIG. 4 illustrates an application module configuration used to perform a data restore procedure according to example embodiments of the present invention. Referring to FIG. 4, module 80 includes an agent "2" file restore module 282, which includes an agent/server module 210, a D-H shared secret module 290, an AES key 284, an encrypted file data module 286, and a decrypted file data module 288. Module 90 is similar to module 60 in FIG. 3, however, a data restore operation is being performed instead of a data de-duplication effort. Like numerals represent like components and modules.

In operation, the data restore operation may be performed by agent "2" using a de-duplication repository copy of the data file. The agent "2" and/or server 210 may retrieve the file(s) to be restored from the online storage location. The agent "2" may then determine that the file is a link file and regenerate the agent/server D-H shared secret 290. The agent "2" may then decrypt the AES key 288 from the link file metadata using the shared secret 290 and retrieve data from the repository location and decrypt with the AES key 284.

The process of performing de-duplication may provide an example with two identical files named file "A" and file "B." Since file "B" is the same as file "A", file "B" will be deleted and replaced with a file including metadata describing the location of file "A", similar to a pointer. In general, a file's size and type are two indications that may be used to determine if the file is a candidate for de-duplication. For the files to be considered identical, both files must have identical filekeys. The filekeys may include an SHA-1 digest and the file size.

The filekey itself is a unique identifier of the file. The filekey may be composed of a SHA-1 digest of the file bytes and a string indicating the size of the file in bytes. The SHA-1 digest for two identical files should be identical. Although the same digest for two different files does not guarantee a collision, the addition of the file size does guarantee uniqueness in the filekey. The filekey is a unique identifier for the file that is used to locate files with identical filekeys, as those files become candidates for de-duplication. A de-duplicated file might also be called a "file pointer." In operation, the agent server 110 may be responsible for locating de-duplication candidates and for performing the actual de-duplication. All agents have unique public/private key pairs created using the server's public key.

The file registry is a database of information about the files. The file registry does not contain the actual file data. The file registry database will have rows of data, with one row for each file stored. The file registry includes one row per file stored. Each row includes the file key, the location of the actual file (URI), a CRC checksum used to authenticate queries and the date the row was created. The SHA-1 digest is a short descriptor of a file created by implementing the SHA-1 algorithm. The filekey is string composed of the digest and the size of the actual file in bytes.

A de-duplicated file is a simple text file containing the location of the actual file. The storage procedure supports metadata for each file stored, and the de-duplicated file includes metadata containing the encrypted AES key and the agent's public shared key. The AES key stored in the file registry row may be used to encrypt/decrypt the actual file. The key itself is encrypted with the agent/server shared secret. Each agent has its own shared secret with the server and database query handler, which decrypts the AES key from agent A and re-encrypts the key for agent B. As a result, agent B is then able to decrypt the AES key and decrypt the actual file.

The agent will determine whether a given file has already been de-duplicated by inquiring with the de-duplication server 120. If a file has been de-duplicated, the agent will store a link file rather than the file itself. The link file is a place holder that represents the deleted file or de-duplicated file, which may include information that allows the agent to locate the source file.

The filekey may be represented as a single entry in a database row. The filekey may be of the form <hex digest <zero-padded file size>. For example, an example filekey may be represented as "78FB8788C222F950FF34AA7951DE410538D21653_000000000042", which could be a filekey for a file with a size of 42 bytes.

A link file may be approximately 500 bytes or so in size. The original file may be several gigabytes in size. The difference between the link file and the original file is that the storage space is reclaimed by de-duplication procedure. The metadata may include that AES key that is used to encrypt the file, which is encrypted with the agent/server shared secret, and the agent's public key.

Figure 5:
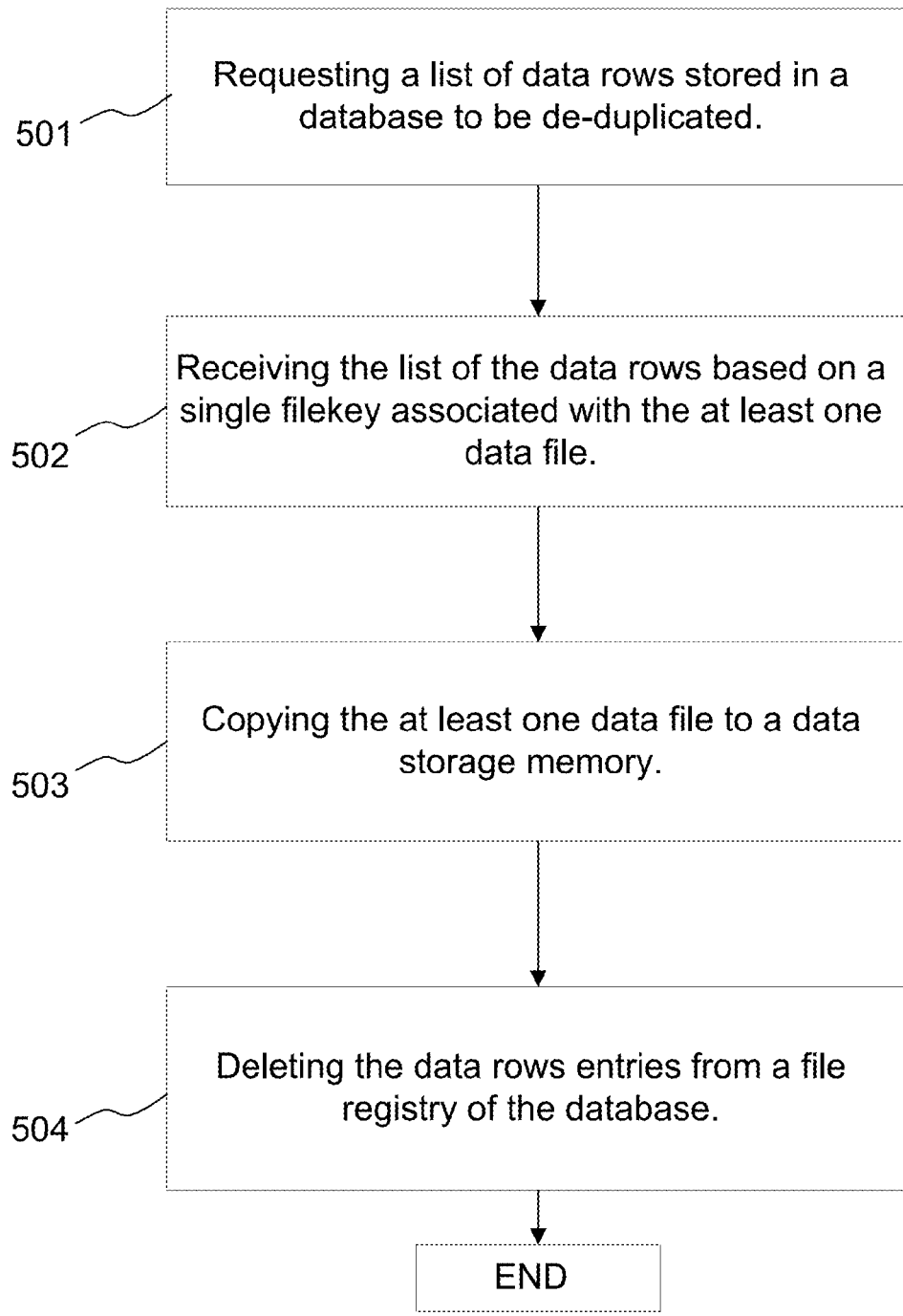
FIG. 5 illustrates a flow diagram of an example method of operation, according to an example embodiment.

FIG. 5 illustrates an example method of operation according to example embodiments of the present invention. Referring to FIG. 5, a method of de-duplicating at least one data file is disclosed. The method may include requesting a list of data rows stored in a database to be de-duplicated, at operation 501, receiving the list of the data rows based on a single filekey associated with the at least one data file, at operation 502, copying the at least one data file to a data storage memory, at operation 503 and deleting the data rows entries from a file registry of the database at operation 504.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 110, 120, 130, 140, 112, 113, and 114.

Figure 6:
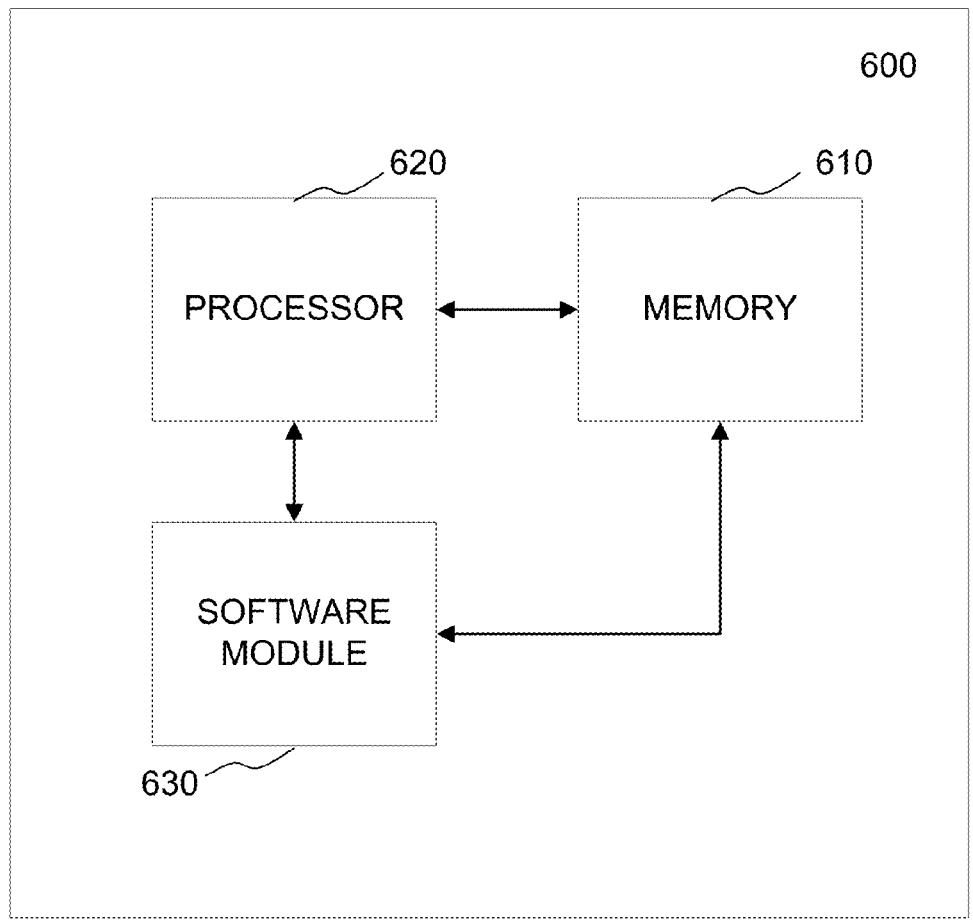
FIG. 6 illustrates an example network entity device configured to store instructions, software, and corresponding hardware for executing the same, according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

What is claimed is:

1. A method, comprising:
   requesting, by a processor, a list of data rows stored in a database to be de-duplicated;
   receiving, by the processor, the list of the data rows based on a filekey associated with the at least one data file;
   deleting the data rows entries from a file registry of the database;
   determining if the filekey has already been de-duplicated;
   decrypting an advanced encryption standard (AES) key associated with each of the rows in the list of data rows; and
   re-encrypting the AES key to transfer the AES key to an agent application.

2. The method of claim 1, wherein the list of the data rows comprises a maximum number of data rows.

3. The method of claim 1, wherein the requesting, receiving, copying and deleting operations are performed by a crawler application.

4. The method of claim 1, further comprising, if the filekey has not already been de-duplicated, copying the at least one data file and metadata to a data repository bucket.

5. The method of claim 1, further comprising copying the at least one data file to a data storage memory.

6. The method of claim 1, further comprising creating a link file in place of the at least one data file including a uniform resource identifier (URI) and the re-encrypted AES key, and storing the link file in an online memory storage.

7. The method of claim 6, wherein the URI of the link file and the re-encrypted AES key are stored in metadata of the link file.

8. An apparatus, comprising:
   a transmitter configured to request a list of data rows stored in a database to be de-duplicated;
   a receiver configured to receive the list of the data rows based on a filekey associated with the at least one data file; and
   a processor configured to:
      delete the data rows entries from a file registry of the database,
      determine if the filekey has already been de-duplicated,
      decrypt an advanced encryption standard (AES) key associated with each of the rows in the list of data rows, and
      re-encrypt the AES key to transfer the AES key to an agent application.

9. The apparatus of claim 8, wherein the list of the data rows comprises a maximum number of data rows.

10. The apparatus of claim 8, wherein the request, receive, copy and delete operations are performed by a crawler application installed in a memory of the apparatus.

11. The apparatus of claim 8, wherein the processor is further configured to if the filekey has not already been de-duplicated, copy the at least one data file and metadata to a data repository bucket.

12. The apparatus of claim 8, wherein the processor is further configured to copy the at least one data file to a data storage memory.

13. The apparatus of claim 8, wherein the processor is further configured to create a link file in place of the at least one data file including a uniform resource identifier (URI) and the re-encrypted AES key, and store the link file in an online memory storage.

14. The apparatus of claim 13, wherein the URI of the link file and the re-encrypted AES key are stored in metadata of the link file.

15. A non-transitory computer readable storage medium configured to store instructions that when executed causes a processor to perform:
   requesting a list of data rows stored in a database to be de-duplicated;
   receiving the list of the data rows based on a filekey associated with the at least one data file;

deleting the data rows entries from a file registry of the database;

determining if the filekey has already been de-duplicated;

decrypting an advanced encryption standard (AES) key associated with each of the rows in the list of data rows; and re-encrypting the AES key to transfer the AES key to an agent application.

16. The non-transitory computer readable storage medium of claim 15, wherein the list of the data rows comprises a maximum number of data rows.

17. The non-transitory computer readable storage medium of claim 15, wherein the requesting, receiving, copying and deleting operations are performed by a crawler application.

18. The non-transitory computer readable storage medium of claim 15, wherein the processor is further configured to perform, if the filekey has not already been de-duplicated, copying the at least one data file and metadata to a data repository bucket.

19. The non-transitory computer readable storage medium of claim 15, wherein the processor is further configured to perform copying the at least one data file to a data storage memory.

20. The non-transitory computer readable storage medium of claim 15, wherein the processor is further configured to perform creating a link file in place of the at least one data file including a uniform resource identifier (URI) and the re-encrypted AES key, and storing the link file in an online memory storage.

* * * * *